UNITED STATES PATENT OFFICE.

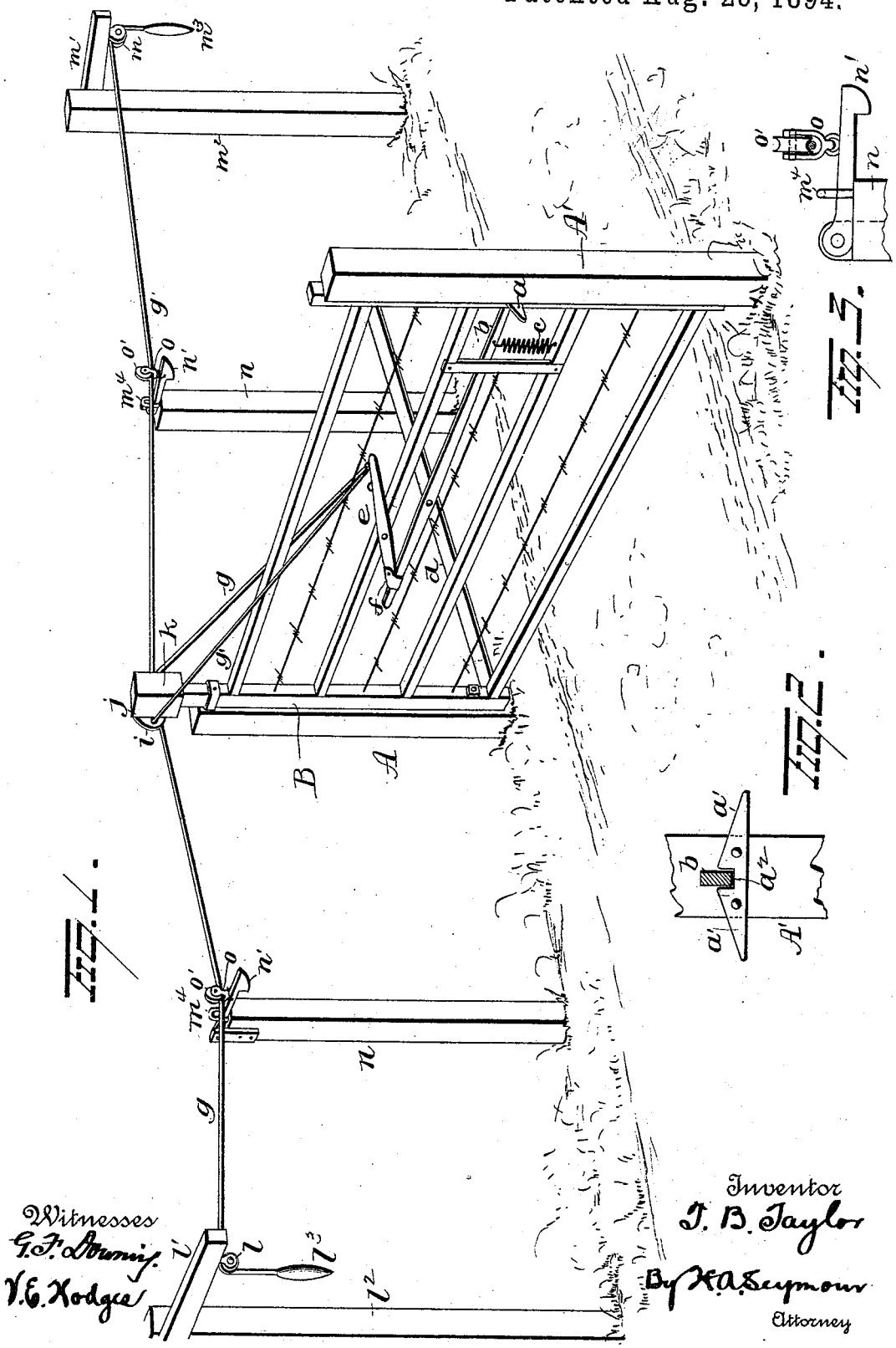

TILFORD B. TAYLOR, OF EL DARA, ILLINOIS.

GATE.

SPECIFICATION forming part of Letters Patent No. 525,297, dated August 28, 1894.

Application filed January 15, 1894. Serial No. 496,982. (No model.)

*To all whom it may concern:*

Be it known that I, TILFORD B. TAYLOR, a citizen of the United States, residing at El Dara, in the county of Pike and State of Illinois, have invented certain new and useful Improvements in Gates; and I do hereby declare the following to be a full, clear, and exact description of the invention, such as will enable others skilled in the art to which it appertains to make and use the same.

My invention relates to an improvement in gates and more particularly to devices for opening and closing the same,—the objects of the invention being to produce simple and efficient means whereby to latch and unlatch a gate; to open and close the same and to retain the gate in an open position for a proper length of time.

With these objects in view the invention consists in certain novel features of construction and combinations and arrangements of parts as hereinafter set forth and pointed out in the claim.

In the accompanying drawings: Figure 1 is a perspective view illustrating my improvements. Figs. 2 and 3 are detail views.

A, A' represent the gate posts, the head B of the gate being hinged to the post A and the post A' being provided with a catch $a$ for the reception of the latch bar $b$, said catch being made with inclined edges $a'$ and a notch $a^2$ and the latch bar is made to enter said slot positively and automatically by means of a spring $c$ secured at one end to said latch bar and at the other end to one of the bars of the gate. The latch bar $b$ is pivoted between its ends to one of the bars of the gate, preferably the diagonal brace bar $d$, and above the rear end of said latch bar, a lever $e$ is pivotally supported at a point between its ends. The rear lower end of the lever $e$ is provided with a shoe $f$ adapted partially to embrace the rear end of the latch bar and have a sliding movement thereto. Above the fulcrum of the lever $e$, two cords $g$, $g'$ are secured, said cords extending rearwardly and upwardly from their connection with the lever $e$ and passed through perforated ears $i$, at opposite sides of a head $j$,—which latter is made fast to the gate head $k$. Cord $g$, after passing through the perforated ear $i$ at one side of the head $k$, is extended laterally, past the head and over a pulley $l$, supported by an arm $l'$ projecting from a post $l^2$,—the free end of said cord being permitted to depend and provided at its extremity with a handle or weight $l^3$. The cord $g'$, after passing through the ear $i$ at the side of the head $k$ opposite the ear through which the cord $g$ passes, is extended laterally in an opposite direction from the cord $g$ and passes over a pulley $m$, supported by an arm $m'$ projecting from a post $m^2$, and at its free end is provided with a handle or weight $m^3$. The distance of the posts $l^2$, $m^2$ from the gate post is greater than the length of the gate, and between said post $l^2$, and the gate post and between the latter and the post $m^2$, posts $n$, $n$ are located and provided at their tops with pivoted catches $n'$, which latter are prevented from moving too far upwardly by means of loops $m^4$. A pulley frame $o$ is loosely connected to each catch $n'$, and the pulleys $o'$ carried by said pulley frames are adapted to turn on the cords $g$, $g$ which pass under them. From this construction and arrangement of parts it will be seen that when one of the cords is pulled, the gate latch will be first lifted to disengage the catch on the gate post A', and a continued pulling on said cord will cause the gate to swing open and when completely open, will engage one of the catches $n'$, and be thereby retained in an open position. The operator after having passed through the gate will pull the cord which terminated at the opposite side of the gate from the one first operated, whereupon, the gate will first be released from the catch $n'$ and a further pull upon said cord will cause the gate to close easily and quickly and become automatically locked in its closed position.

My improvements are very simple in construction, cheap to manufacture, easy to operate and effectual, in every respect, in the performance of their functions.

Having fully described my invention, what I claim as new, and desire to secure by Letters Patent, is—

The combination with two main posts A, A' and side posts $l^2$, $m^2$ and $n$, of a gate hinged to one of the main posts, a latch bar hinged to the gate, a lever hinged to the gate and having sliding connection with the latch, cords extending from the free end of the lever, said cords passed through eyes attached to the gate and thence to the outer posts $l^2$, $m^2$, where they terminate in handles, catches $n'$ hinged to the posts $n$, said catches provided with sheaves beneath which the cords are passed, and loops $m^4$ for guiding and confining the catches, substantially as set forth.

In testimony whereof I have signed this specification in the presence of two subscribing witnesses.

TILFORD B. TAYLOR.

Witnesses:
 L. N. WORSHAM,
 J. O. STRULINGER.